United States Patent [19]

Hamilton

[11] Patent No.: US 6,186,727 B1
[45] Date of Patent: Feb. 13, 2001

[54] APPARATUS AND METHOD FOR TRANSPORTING MOTORCYCLES

[76] Inventor: Steven P. Hamilton, 1506 Lakeside La., Huntington Beach, CA (US) 92648

[*] Notice: Under 35 U.S.C. 154(b), the term of this patent shall be extended for 0 days.

[21] Appl. No.: 09/449,698

[22] Filed: Nov. 24, 1999

Related U.S. Application Data

[63] Continuation-in-part of application No. 09/139,224, filed on Aug. 24, 1998, now abandoned.

[51] Int. Cl.[7] .............................. B60B 30/00; B65G 7/00
[52] U.S. Cl. ...................... 414/426; 414/427; 414/428; 280/43.17
[58] Field of Search .................. 414/426, 427, 414/428, 429, 462; 280/402, 43.17; 254/8 R

[56] References Cited

U.S. PATENT DOCUMENTS

| | | | |
|---|---|---|---|
| 1,650,031 | * 11/1927 | Nash | 414/429 X |
| 2,436,499 | * 2/1948 | Williams | 280/402 |
| 2,551,483 | * 5/1951 | Bartoe | 414/428 |
| 2,807,380 | * 9/1957 | Boehnke | 414/428 |
| 3,378,154 | * 4/1968 | Mousel | 414/428 |
| 3,740,074 | * 6/1973 | Coil | 280/402 |
| 3,963,129 | * 6/1976 | Clayton | 414/462 X |
| 4,690,605 | * 9/1987 | Coccaro | 414/429 |
| 4,696,484 | * 9/1987 | Casey | 414/427 |
| 5,735,538 | * 4/1998 | Mosher et al. | 414/427 X |

FOREIGN PATENT DOCUMENTS

| | | | |
|---|---|---|---|
| 1526694 | * 4/1968 | (FR) | 280/43.17 |
| 1043074 | * 9/1983 | (RU) | 280/43.17 |

* cited by examiner

Primary Examiner—Steven A. Bratlie
(74) Attorney, Agent, or Firm—Oppenheimer Wolff & Donnelly LLP

[57] ABSTRACT

The present invention discloses a transporting assembly for maneuvering a motorcycle around a garage or onto the back bed of a tow truck. The transporting assembly includes a rear chock associated with the back side of the front wheel, a front chock associated with the front side of the front wheel, and a dolly coupled to both front and rear chocks. The dolly has an actuator which causes the dolly to extend two of its arms to raise the transporting assembly off the floor, so that when the front wheel of the cycle is strapped onto the transporting assembly, as the dolly is actuated, the transporting assembly, along with the front wheel of the cycle, raises off of the floor. The free ends of the arms are coupled to a wheel so that the entire transporting assembly and the cycle may be maneuvered about the floor by a single operator.

22 Claims, 10 Drawing Sheets

FIG. 21

APPARATUS AND METHOD FOR TRANSPORTING MOTORCYCLES

CROSS-REFERENCE TO RELATED APPLICATION

This application is a continuation-in-part of U.S. patent application Ser. No. 09/139,224, filed Aug. 24, 1998 now abandoned, which is hereby incorporated by reference into this application.

BACKGROUND AND SUMMARY OF THE INVENTION

A motorcycle (called "cycle" throughout this patent application) is often a very heavy thing. When the cycle is not in operation it is very difficult or impossible for one man to load it onto a truck (typically a tow truck).

There are different situations when it is desired to load a nonfunctioning cycle onto a truck. For example, the cycle may have a front wheel that is damaged and accordingly not rotating properly, so that it is desired to take the cycle to a repair shop. As another example, it may be desired to pick up a cycle that is not operating because it is turned off and is locked. This occurs when an attempt is being made to impound the cycle, repossess the cycle, etc.

A big problem with prior-art apparatus for use in transporting cycles is that it is often large, bulky and heavy. Thus, it is difficult to store, transport, load, unload and use. For example, the single operator of a tow truck used to pick up disabled cycles does not want to have a large heavy apparatus permanently mounted on that truck so as to be readily available when needed. Instead, he wants an apparatus that is knocked down or collapsed, yet substantially ready for use at any desired time.

SUMMARY OF THE INVENTION

In accordance with the present apparatus and method, a combination chock and cradle apparatus is provided around the lower part of a cycle wheel and is associated with a collapsible dolly that is adapted to substitute for the cycle wheel in supporting one end of the cycle.

Six "bootstrap" connector elements are provided between the chock/cradle apparatus and five or more portions of the cycle body. In the preferred embodiment, one or two "bootstrap" connector elements ensure that the wheel (if it is the front wheel) does not turn about a vertical axis (that is to say, flop).

The chock/cradle apparatus is then lifted off the ground, thus making the dolly wheels fully operative to be employed in moving the cycle to a desired location, such as the bed of a tow truck. In the preferred form, the elevation of the chock/cradle apparatus off the ground is effected by a mechanism on the dolly, and by the "bootstrap" connector apparatus that is shortened to provide a lifting action.

The lifting action relative to the cycle wheel is much facilitated by lever action. Furthermore, the chock/cradle apparatus may be formed from a tubular frame to reduce the cost of manufacturing the chock/cradle apparatus and weight.

In accordance with one aspect of the present invention, these and other objectives are accomplished by providing a rear chock adapted to associate with the back side of a first wheel of the cycle; a front chock adapted to associate with the front side of the first wheel of the cycle, said front chock releasably coupled to said rear chock; a dolly releasably coupled to said rear chock, said dolly having a rotatable actuator and a pair of arms each having a pivotal end and a free end, each of said arms adapted to link to said actuator; and a pair of wheels coupled to respective free ends of said arms; wherein when said actuator is linked to said pair of arms and said actuator is activated, said pair of arms extend to cause the pair of wheels to come in contact with the floor, thereby raising the transporting assembly along with the first wheel of the cycle which is strapped into the transporting assembly, whereby said cycle secured to said transporting assembly may be maneuvered.

In accordance with yet another aspect of the present invention, one of the methods of accomplishing the above objectives is by providing a transporting assembly including a rear chock, front chock, a pair of side bars, and a dolly, wherein the dolly has an actuator and a pair of arms, wherein each of said arms have a pivotal end and a free end, said pivotal end of each of said arms pivotally coupled to the actuator and the free ends have a wheel, wherein rotation of said actuator causes said pair of arms to extend to raise the transporting assembly; placing the rear chock behind a first wheel of a motorcycle; placing the front chock on the front side of the first wheel of the motorcycle; coupling the front and rear chocks with the pair of side bars with the first wheel of the motorcycle within the rear and front chocks and the pair of side bars; coupling the dolly to the pair of side bars on the front chock side of the pair of side bars; strapping the motorcycle to the transporting assembly; and rotating the actuator to raise the transporting assembly along with the first wheel of the motorcycle, whereby the transporting assembly and the motorcycle may be moved by applying force to the transporting assembly.

The above described and many other features and attendant advantages of the present invention will become apparent from a consideration of the following detailed description when considered in conjunction with the accompanying drawings.

DETAILED DESCRIPTION OF THE PREFERRED EMBODIMENT

As above stated, the word "cycle" means "motorcycle" throughout this application. The present apparatus and method are shown and described as being employed relative to the front wheel of a cycle. It is to be understood, however, that the present method and apparatus may also be employed relative to the back wheel of a cycle. Also, the present method and apparatus may be employed simultaneously relative to both the front and back wheels of a cycle.

Figure 1:
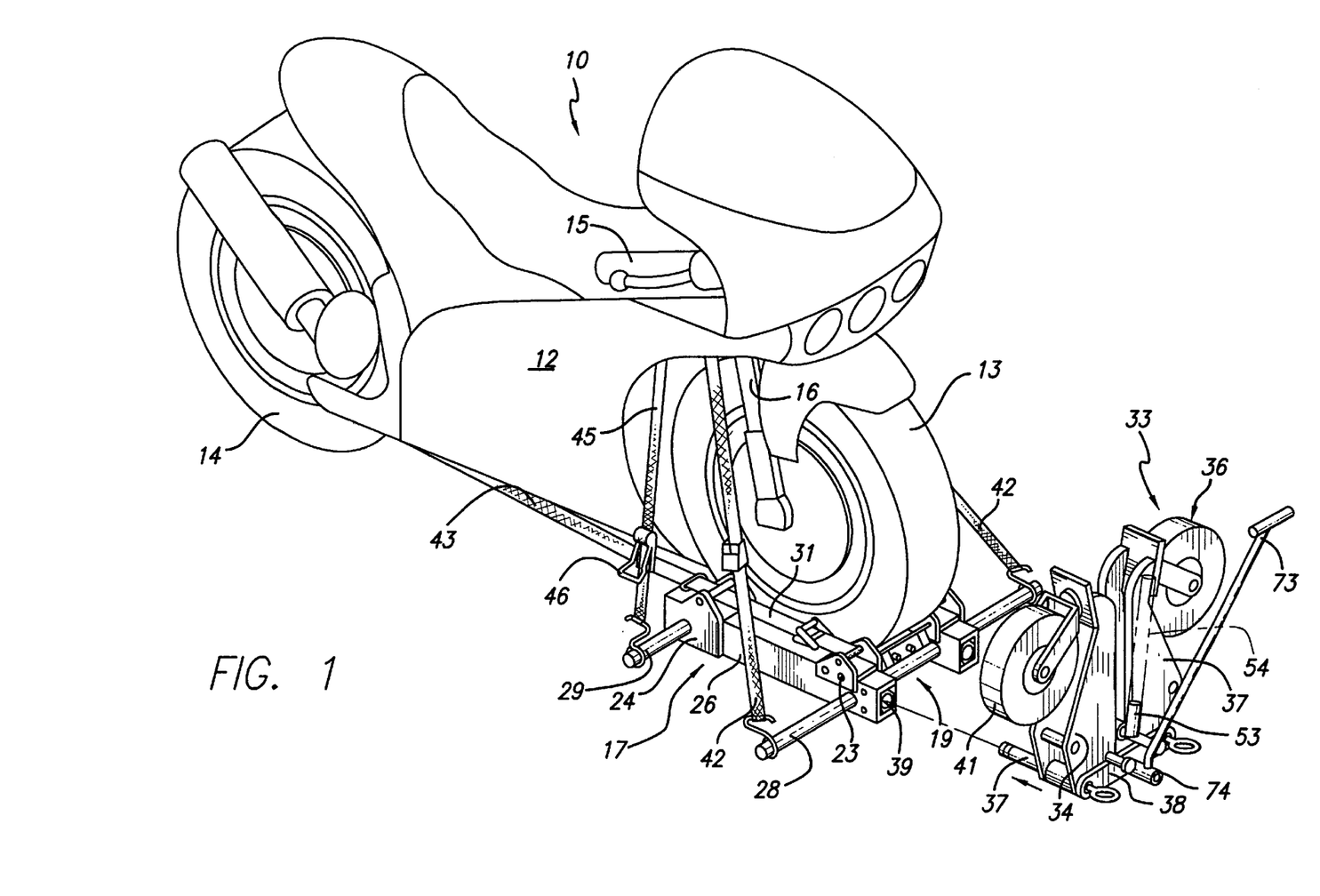
FIG. 1 is a perspective view showing the front wheel of a cycle disposed in the chock/cradle apparatus, prior to association of the dolly with such apparatus.

A cycle 10 is shown in FIG. 1 as sitting in upright condition on a floor, road, etc. 11 indicated not only in FIG. 1 but by horizontal lines in FIGS. 2, 3, 4, and 10. Cycle 10 is conventional, having a body 12, front and rear wheels 13, 14, and a handlebar 15 and associated fork 16 for turning front wheel 13 about a generally vertical axis.

The front wheel 13 is shown as resting on the floor or road 11 after a combination chock/cradle 17 has been assembled around and beneath the lower portion of front wheel 13, and is itself (the chock/cradle) resting on floor 11.

Figure 5:
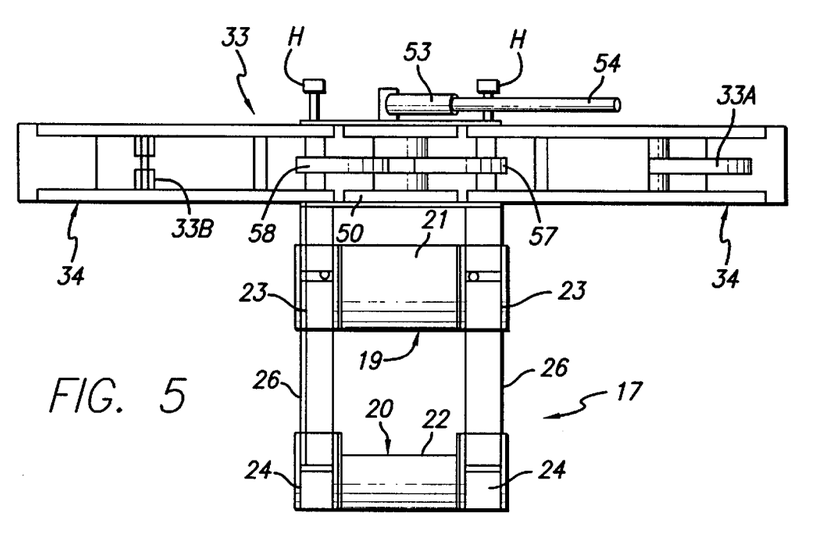
FIG. 5 is a top plan view of the showing of FIG. 7, but with no cycle wheel.
Figure 7:
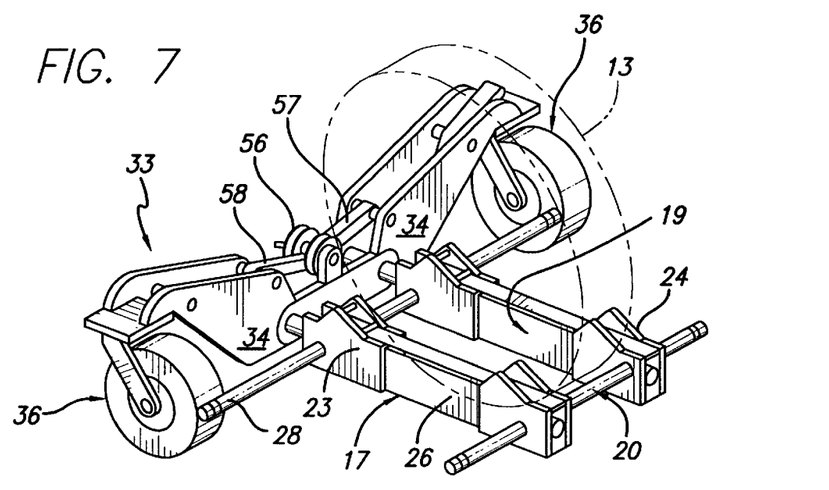
FIG. 7 is a view showing the cycle wheel supported in the dolly.

As best shown in FIGS. 1, 5 and 7, the combination chock/cradle 17 comprises a front chock 19 and a rear chock 20, these having downwardly-convergent inclined surfaces adapted to fit snugly below and in contact with the bottom regions of front wheel 13.

Thus, there is an inclined metal plate 21 that is welded at its ends to end elements 23, and an inclined plate 22 welded at its ends to end elements 24. Plate 21 and end elements 23 are part of front chock 19. Plate 22 and end elements 24 are part of rear chock 20.

The sets of end elements 23, 24 mount on side bars 26, there being two strong bars adapted to rest on the floor 11 on opposite sides of front wheel 13. The relationships are such that the sets of end elements 23, 24 rest on side bars 26 and are so associated therewith that the distance between the chocks may be adjusted somewhat—within the range of the usual tire diameters of the cycles.

In operation (and in performance of the method), one of the side bars 26 is first disposed on one side of the front wheel, lying on the floor and parallel to the wheel. The other side bar is correspondingly disposed on the floor on the other side of the front wheel. Then the end elements 23, 24, which respectively have the chocks 19, 20 welded between them, are assembled and connected with the side bars 26, as shown (for example) in FIGS. 1 and 7. The chocks are caused to be close to the surfaces of the front wheel 13.

Figure 10:
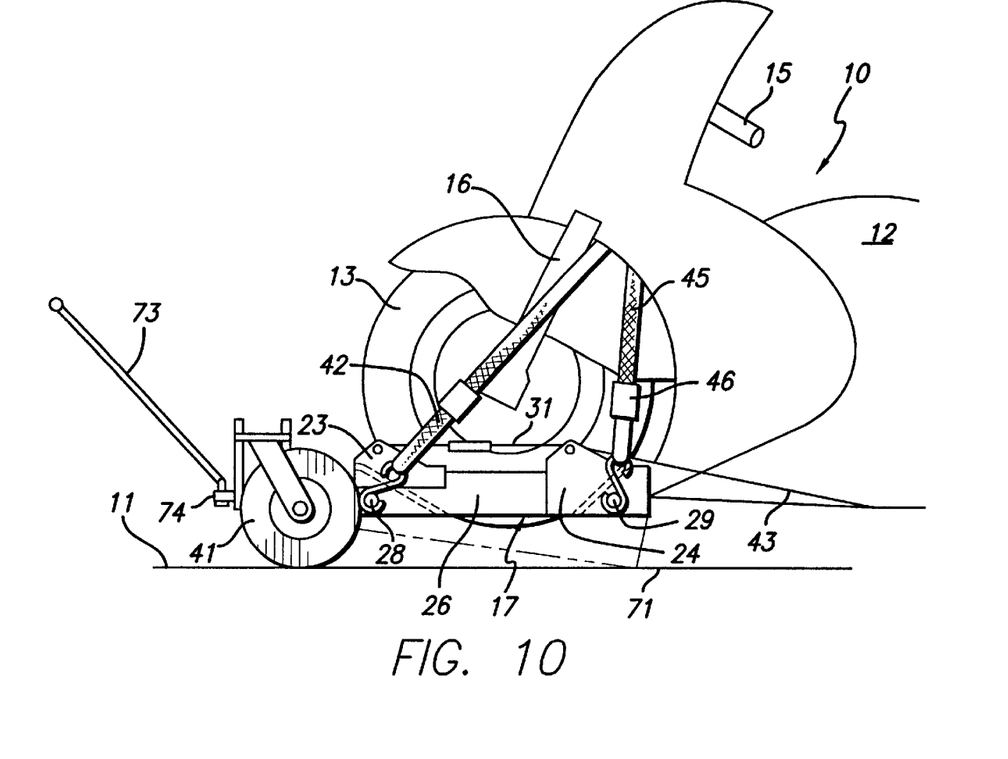
FIG. 10 is a side elevational view of the front portion of the cycle in condition for wheeling to a desired position such as a ramp leading to the bed of a tow truck.

Two elongate outrigger bars 28, 29 are mounted as shown in FIGS. 1, 7 and 10 (such bars are not shown in FIG. 5).

The rear outrigger bar 29 extends not only through holes in side bars 26, but also through holes in end elements 24 of the rear chock assembly. The front outrigger bar 28 also extends through holes in side bars 26 but does not extend through end elements 23, this being because it is desired that the end elements 23 may be adjusted in positions longitudinally of the side bars 26 as required by the wheel diameter of the particular cycle.

The front and rear chocks 19, 20 are maintained closely engaged with the outer surface of the tire of front wheel 13 by straps 31 shown in FIGS. 1 and 10. There is one strap on each side of front wheel 13, the ends of each strap being connected between the associated end elements 23, 24 on the same side of the wheel 13. Each strap has a suitable buckle incorporated therein, and each strap connects to bars on the upper sides of end elements 23, 24. One end of at least one of these straps is attached (as stated below) to the cycle frame to prevent the front wheel from turning.

Figure 2:
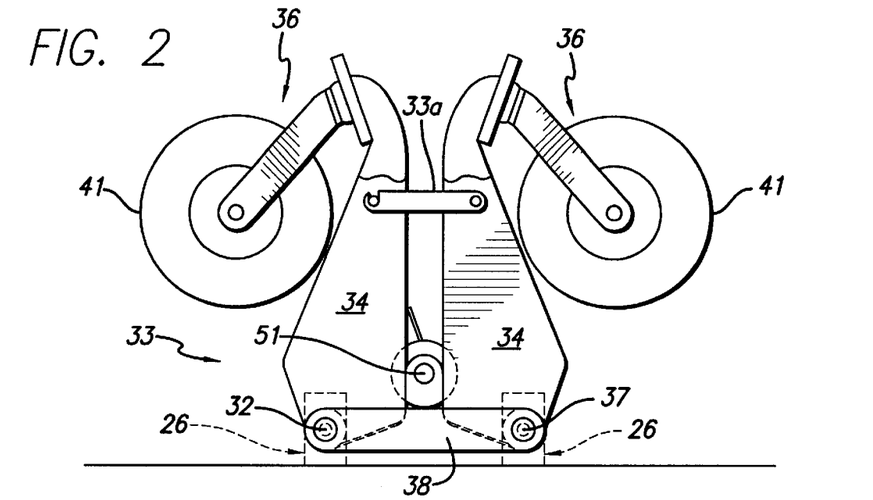
FIG. 2 is a front elevational view of the dolly, showing it in collapsed condition ready for carrying by the operator.

A dolly 33 is then associated with the forward ends of side bars 26 while the bars 26 are resting on the floor 11. As best shown in FIGS. 1 and 2, dolly 33 is initially in a highly compact collapsed condition such that it may be carried by one hand of the operator. In so carrying the dolly, the operator grasps an element that extends between the pivoted-together arms of the dolly 33.

The dolly 33 has strong welded arms 34, each of which has a castor-wheel assembly 36 mounted at the outer end thereof. Each assembly 36 is a large-wheel ball-bearing type to facilitate movement of the cycle.

An element adapted to be grasped (like a handle) by one hand of the operator is numbered 33a in FIGS. 2 and 5. It is a pivoted arm that hooks beneath a cross element 33b (FIG. 5) to both retain the arms 36 close together and also to serve as the carrying handle for the operator.

The inner ends of arms 34 (shown at the bottom of FIG. 2, for example) connect to trunnions 37 that extend forwardly through the side elements of the arms 34; they also extend rearwardly for a substantial distance from the arms as illustrated in FIG. 1. The trunnions 37 extend through links 38 that connect the lower ends of the arms.

As above indicated, dolly 33 is assembled with the side bars 26 and associated parts while the side bars are resting on the floor 11. This is done, as shown in FIG. 1, by moving the closed (compact condition) dolly 33 forwardly to cause the protruding trunnions 37 to enter holes 39 (FIG. 1) in the forward ends and bodies of the side bars. The dolly 33 is moved rearwardly until the trunnions 37 penetrate all the way into the holes 39 and thus telescope within the forward portions of side bars 26. Thereafter, the connector/handle 33a (FIG. 2) is released to permit the castor-wheel assemblies 36 to pivot downwardly until the wheel portions 41 thereof are resting on the floor or road 11. This position is shown generally in FIG. 3.

Figure 8:
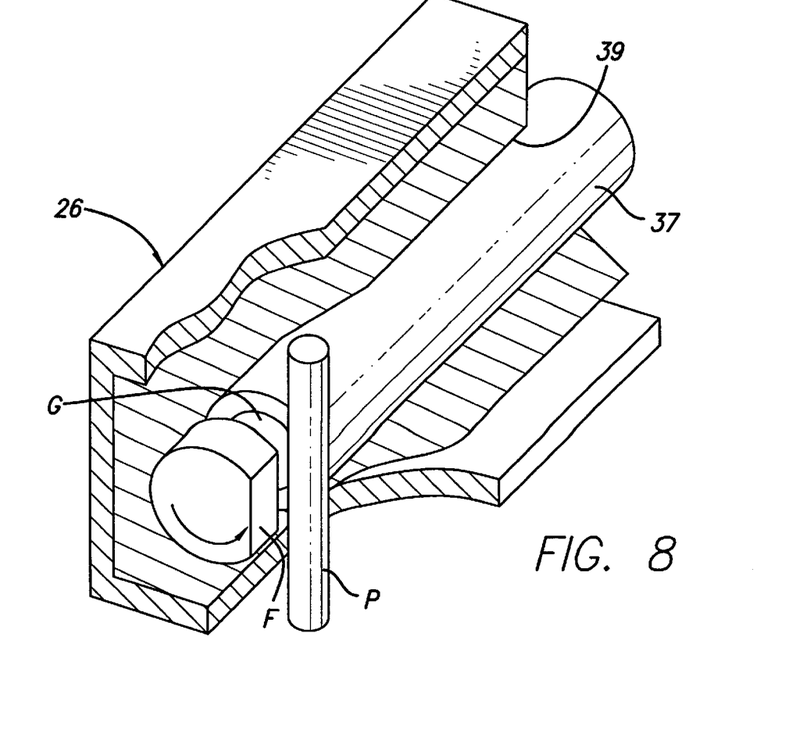
FIG. 8 is an isometric view illustrating the rotatable trunnion lock.
Figure 9:
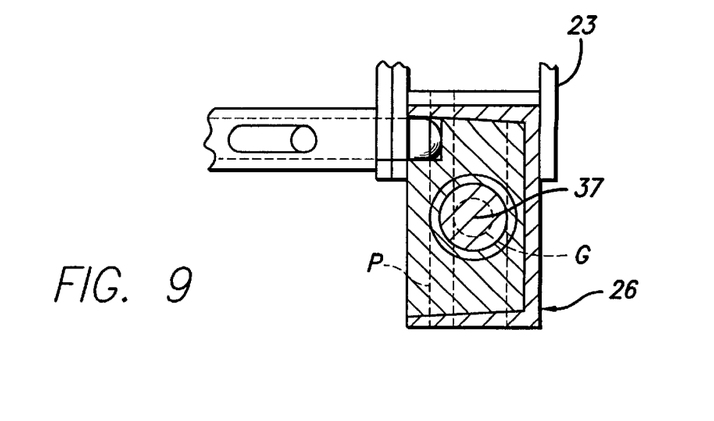
FIG. 9 is a view of the sliding chock retaining pin engaged in chock/cradle elements.

When the castor wheel assemblies (and associated dolly arms) thus pivot downwardly, the protruding trunnion ends automatically lock in the side bars so that the trunnions cannot pull out of the side bars. The trunnions connect to the dolly arms and rotate with them. As shown in FIG. 8, there are annular grooves G in the trunnion 37 that receive pins P fixed to side bars 26. Only when flat Fs at each trunnion end is parallel to pins P may the trunnion ends be pulled out of the side bars, or fully inserted therein. This occurs only when the dolly is collapsed.

As the next step in the method, combination wheel-holding and "bootstrap" elements are employed to tightly secure the front wheel 13 (and associated fork 16, etc.) in the desired position. Such "desired position" may be one of at least two positions. One such desired position is the one illustrated, with the front wheel 13 aligned with rear wheel 14. The other "desired position" is one (not shown) at which the front wheel 13 and associated fork 16 and handlebar 15 are turned all the way permitted, to what is usually a locked condition with the wheel at a large angle to the body 12 of the cycle.

The present invention permits the cycle to be moved by one operator regardless of whether the front wheel 13 is in the illustrated position or in the described turned position.

The above-indicated combination wheel-holding and "bootstrap" elements are provided in the form of straps shown in FIG. 1. Some of such straps perform wheel holding and also maintain the cycle 10 in the illustrated upright condition, while others maintain the cycle in the illustrated upright condition and also perform a "bootstrap" function described below.

Thus, the illustrated straps 42 extend between the outer ends of outrigger bar 28 and suitable support points on the upper portion of the body 12 of the cycle 10. Tightening elements are incorporated in the straps 42, and in the other straps, each being a ratcheting buckle as (for example) indicated in FIG. 1.

Other strap elements are indicated at 43 and extend rearwardly from the rear ends of side bars 26 for connection to suitable points on the body 12 of cycle 10, to keep the front wheel 13 from pivoting about a generally vertical axis (along with fork 16 and handlebar 15). When there is no lock keeping the wheel 13 in the described position aligned with rear wheel 14, then the straps are the sole means for performing this function. If the wheel is locked against pivoting about a generally vertical axis, then less straps need be employed in order to take the play or "slop" out of the pivot, so that the wheel is maintained rigidly against pivoting about a generally vertical axis.

The straps 45 are especially important parts of the combination wheel-holding and bootstrap elements; they extend between the outer ends of outrigger bars 29 and suitable connection points at the upper regions of the body 12 of cycle 10. A ratcheting buckle 46 is incorporated in each of the straps 45 in order to exert large forces when actuating portions of the ratcheting buckles 46 are operated in a direction to tighten straps 45.

After the various straps are tightened, but not so tight as to effect elevation of any portion of the cycle 10, the cycle is effectively held in the illustrated upright condition and, furthermore, the front wheel 13 is prevented from pivoting along with the fork 16 and handlebar 15. Stated otherwise, everything is tight and snug. Furthermore, the combination chock/cradle assembly 17 is held closely against the underside of front wheel 13. The straps 31 cooperate in this action in that they prevent the chocks from spreading apart.

As the next step in the preferred form of the method, the dolly 33 is then operated to elevate the central portion thereof and thus cause a certain pivoting and lever action relative to the chock/cradle assembly 17. Thus, and referring to FIGS. 3–6, the next step in the method comprises lifting the central portion of dolly 33 off the floor. In accordance with one aspect of the invention, such lifting is effected by a disconnectable pitman-type a rod for connecting two moving parts actuating mechanism that can be manually operated by one person.

There are two upwardly-extending opposed bearing plates 50 (FIGS. 5 and 6) that are strongly secured to the interior surfaces of the horizontal links 38. A horizontal actuating shaft 51 is rotatably mounted in the bearing plates 50, such shaft having a forwardly-extending portion on the forward end of which is provided an upwardly-extending socket 53. Socket 53 removably receives the lower end of an actuating crank handle 54 that may be employed to rotate the actuating shaft 51 with great force.

Figure 6:
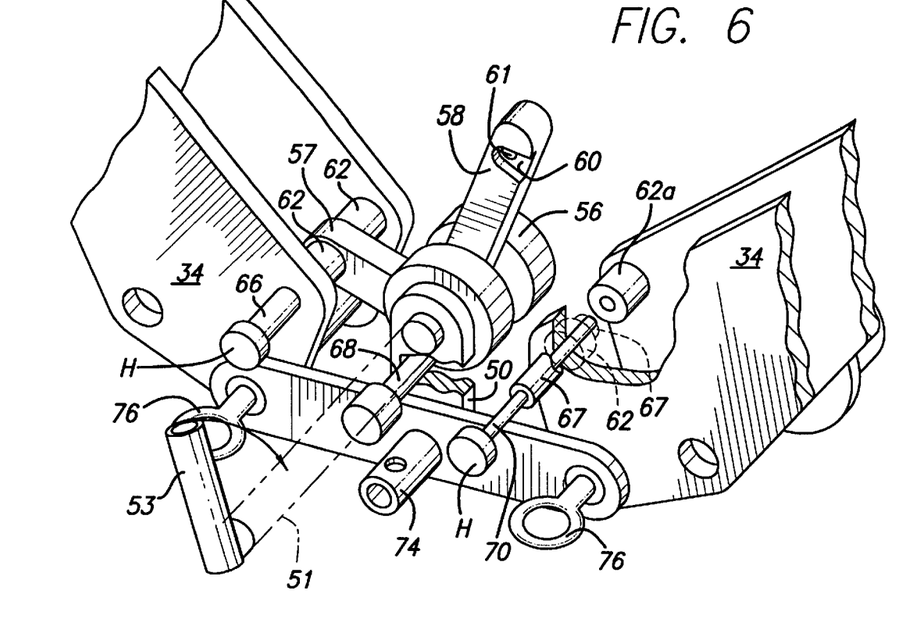
FIG. 6 is an isometric view of the central part of the dolly.

Fixedly mounted on shaft 51 between bearing plates 50, so as to rotate with shaft 51, are two spaced-apart wheels 56. Disposed between such wheels 56 and strongly pivotally connected to diametrically-opposite portions of such wheels 56, are the inner ends of pitman elements or links (connecting rods) 57, 58.

The outer ends of links 57, 58 are connected pivotally (FIG. 3) to the inner ends of arms 34 of dolly 33 in a disconnectable manner that makes it easy to disconnect such links and collapse the dolly to the condition shown in FIG. 2, at which it is readily stored and transported as above described. Stated more definitely, the outer ends of links 57, 58 are connected to upper portions of the inner ends of arms 34, the lower portions of such arms 34 being connected pivotally to each other by the above-described links 38 and trunnions 37.

As best shown in FIG. 6, the outer end of each link 57, 58 has on its inner side a recess 60 that opens downwardly when the link is in operating condition (reference being made to the upper-center portion of FIG. 6). Furthermore, there communicates with the center of such recess a hole 61 that extends horizontally through that portion of the link end not containing the recess.

Figure 11:
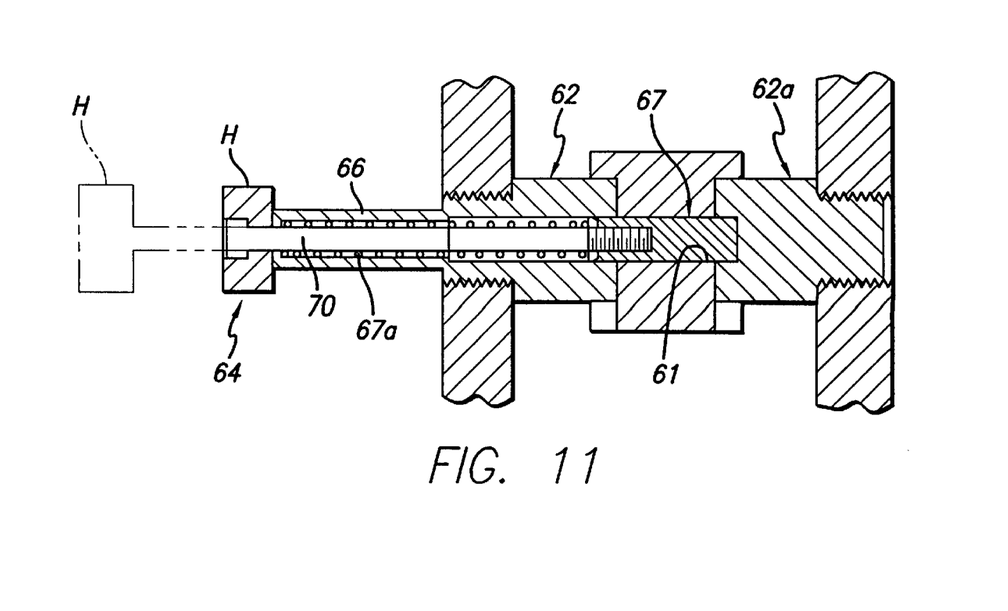
FIG. 11 is a sectional view showing lock mechanism for the dolly.

There are for each arm 34 two aligned socket and bearing elements 62 and 62a (FIG. 11). The elements 62 and 62a are respectively strongly secured to parallel-plate portions of the arms 34.

Referring especially to FIG. 11, each element 62 is much longer than the opposed element 62a, and has a shouldered bore therein. A handle (knob) H of the forward side of the dolly connects to a shaft 70 in such bore-shaft 70 that in turn connects to a larger shaft 67, the latter being adapted at its inner end to seat in a shallow bore in element 62a. A helical compression spring 67a, which is around shaft 70, and is seated at its outer end in a necked-down outer end of element 62, forces shaft 67 into the recess in 62a at all times except when handle H is intentionally pulled forwardly.

To connect the outer end of each pitman 57, 58 to its associated arm end portion, the operator pulls forwardly on the handle H, for example to the position shown at the right in FIG. 6. This pulls the inner end of rod portion 67 out of the rear socket 62 and permits the pitman 58 to pivot clockwise (FIG. 6). The amount of outward pulling of handle 65 is just sufficient that the recess 60 fits over the inner end of rod portion 67, so that the pitman 58 (for example) is held in proper pivoted position. The handle H is then released to permit the spring to force rod 67 rearwardly through hole 61 and into socket 62a. In this manner, the inner portion of each connecting and locating rod is pivotally connected to the outer end of a pitman 57, 58.

Figure 3:
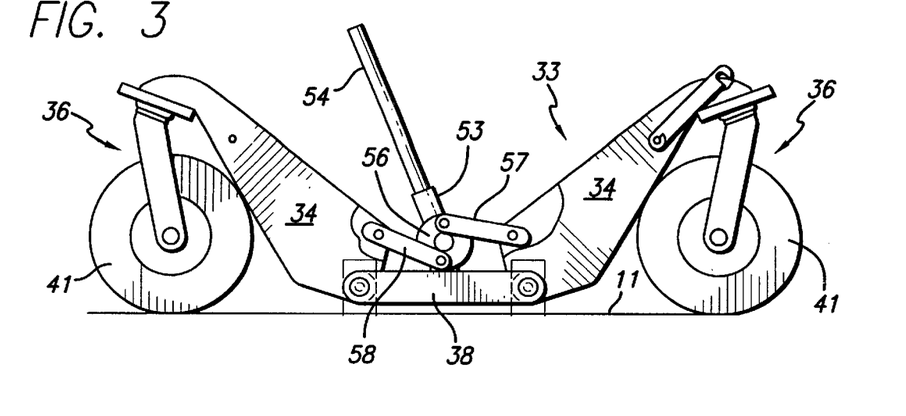
FIG. 3 is a view corresponding to FIG. 2 but showing the dolly after it has been made ready for use, by lowering the wheels to the ground.
Figure 4:
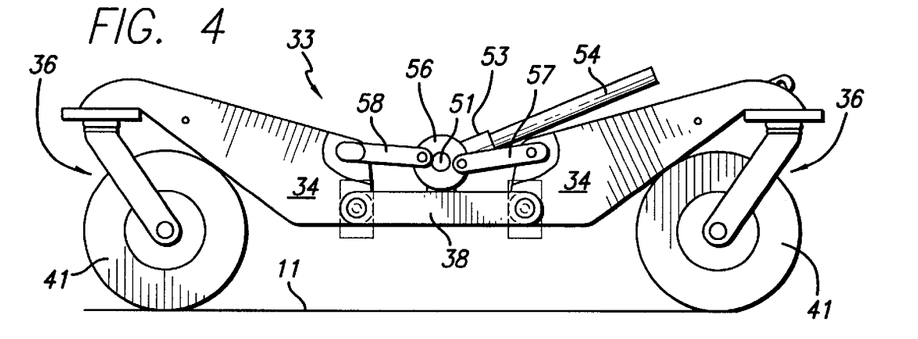
FIG. 4 corresponds to FIG. 3 but shows the central portion of the dolly elevated.

After the pitman links 57, 58 are in the operating condition shown at the left in FIG. 6, and also in FIG. 3, the operator employs the actuating handle 54 by rotating it approximately 90 degrees clockwise from the FIG. 3 position to the FIG. 4 position, thereby actuating the outer ends of arms 34 apart and elevating the central region of the dolly 33 as illustrated. The degree of rotation of handle 54 and thus actuating shaft 51 and wheels 56 is controlled by a limit or stop element consisting of a pin 68 that passes fixedly through the forward bearing plate 50 and into an arcuate groove in the forward wheel 56. Such groove is on the lower portion of wheel 56 as shown in FIG. 6. It is to be understood that the pin and groove could, instead, be on the backside of the apparatus.

When the actuating crank handle 54 is shifted from the FIG. 3 to the FIG. 4 position, after the front wheel 13 has been nested closely in its chock/cradle and the cycle 10 strapped tightly in vertical position as shown in FIG. 1 and above described, a powerful lever action is created to lift wheel 13 and thus the forward portion of cycle 10 off the floor 11.

Referring to FIG. 10, the combination chock/cradle 17 is shown tilted in dashed lines, with its rear corner 71 resting on floor 11 and the remainder thereof inclined upwardly and to the left at a shallow angle. Such lifting is effected by the large mechanical advantage created by the long actuating crank handle 54, and by the pitman and wheel actuating linkage 56–58. The lever action shown in dashed lines in FIG. 10 is a second-class lever action, with the fulcrum 71 at one end, with the actuating mechanism at the other end, and with the load located between the fulcrum and the actuating mechanism. (A second-class lever is one in which the fulcrum and force are at opposite ends of a lever, and the load is at an intermediate portion of such lever.)

After the chock/cradle assembly is tilted to the dashed-line position of FIG. 10, a check is made to be sure that the straps 42, 45, etc. are tightened to the desired degree. If not, the actuating buckles thereof are suitably adjusted.

As the next step in the method, the ratchet buckles 46 for straps 45 on both sides of the cycle 10 are ratcheted to cause such straps 45 to lift the rear portion of the combination chock/cradle off the ground, for example to a substantially horizontal full-line position shown in FIG. 10. This is also a second-class lever action but with the fulcrum portions and actuating portions reversed. Thus, in this case the fulcrum is at the dolly 33, more specifically at the bottom regions of the wheels 41 of such dolly 33, whereas the force is applied to both ends of the outrigger bar 29 by both straps 45 and their ratcheting buckles 46. During or after this last-mentioned lever and lifting action, the straps 42 are checked to maintain them reasonably taut, and suitable adjustments are made if desired.

In the above-described method, the forward end of the cycle 10 is almost literally picked up by its own bootstraps and lifted off the ground so that the dolly wheels 41 become very operative to permit the cycle to be moved to a desired spot by the operator, who (for example) pulls on a handle 73 that is removably secured to a connector 74 as shown in FIGS. 1 and 6. Typically, the cycle is moved until it is adjacent a ramp portion of a tow truck having an actuating mechanism on it and a cable to pull the cycle up the ramp. The cable is secured, for example, to two ring connectors 76 shown in FIG. 6.

After the cycle 10 has been winched up the ramp by a motor on the truck, it is strapped to the dolly by additional straps and then transported to a desired location in upright condition.

When it is desired to remove the dolly 33 from the chock/cradle mechanism, the straps are released and the handles H are pulled forwardly (FIG. 6) to release the outer ends of pitman links 57, 58 from arms 34. The arms 34 are then pivoted upwardly to the condition of FIG. 2, being secured in such condition by the mechanism 33a.

This is normally done after the tow truck has reached its destination and the cycle has been moved down the ramp under control of the winch on the tow truck. It is also normally not done until after the motorcycle has been put at some desired parking or repair spot at the destination point.

FIGS. 12 through 16 illustrate by way of example another embodiment of the present invention. In this embodiment, elements with similar descriptions, as shown in FIGS. 1–11, will be marked with the same numeral with a prime "'". As shown by way of example in FIG. 15, a rear chock 20' is preferably formed from a U-shaped member with two free ends 39' and a bend area 21. The bend area preferably has an approximate 180° bend adapted to associate with the back side of one of the wheels of a cycle. Accordingly, a pair of parallel members 108 are formed extending from the bend area to the two free ends 39'. Furthermore, the bend area preferably has an opening 102 to receive a rear outrigger bar 29' therethrough. Alternatively, it is within the scope of the present invention to couple the rear outrigger bar 29' on the outer surface near the bend area 21 such that the rear outrigger bar is perpendicular to the parallel members 108. Preferably, the rear chock is formed from a tubular member. In other words, the rear chocks may be formed from a tubular member with a predetermined length that is bent 180° at the mid point thereof.

Figures 15, 16:
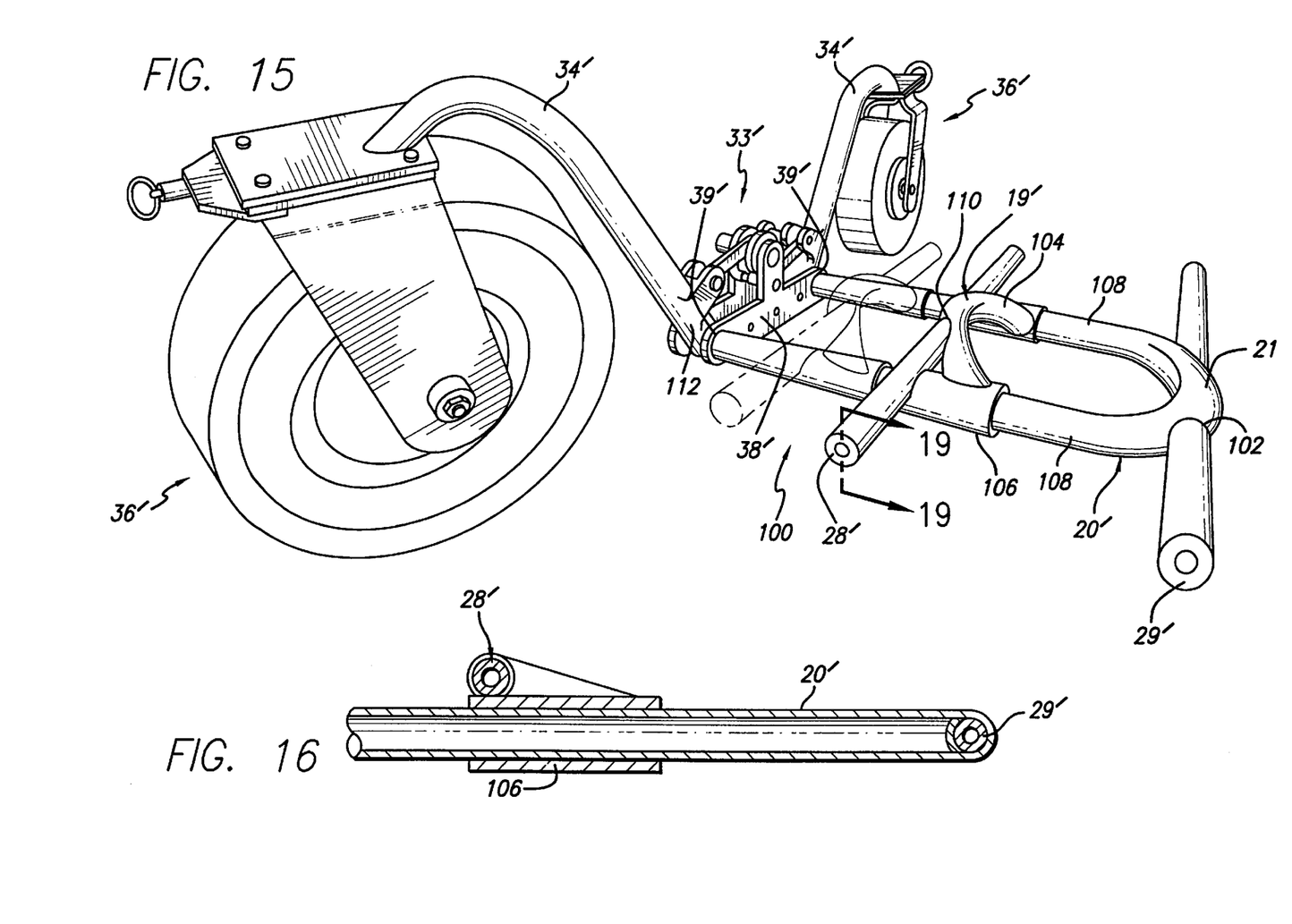
FIG. 15 is still another perspective view of the chock/cradle apparatus corresponding to FIG. 12 without the wheel from a cycle secured to the chock/cradle apparatus.
FIG. 16 is a cross-sectional view of the front and rear chocks along the line 16—16 in FIG. 14.

As further illustrated in FIG. 15, the front chock 19' preferably includes a arcuate member 104 with a cylinder 106 coupled to each of the free ends of the arcuate member 104. Preferably, the cylinder 106 has an inner diameter that is slightly greater than the outer diameter of the U-shaped rear chock formed from the tubular member. This allows the front chock 19' to slide along the pair of parallel members 108 of the rear chock 20'. Preferably, the rear chock 20' is formed with an approximate 1½-inch outer diameter and a 1.0-inch inner diameter tubing, while the cylinders 106 are made of 2-inch outer diameter and 1½-inch inner diameter sections.

Furthermore, as shown in FIG. 16, the arcuate member 104 is in an inclined position relative to the planar surface of the U-shaped rear chock 20'. As such, the front chock 19' can slide along the parallel members 108 to adjust to any wheel size of a cycle to securely hold the wheel between the front and rear chocks. Also, as in the bend area 21 of the rear chock 20', the bend area of the front chock 19' has an opening 110. Through the openings 110 is a front outrigger bar 28'. As shown in FIG. 16, the front outrigger bar 28' is elevated relative to the rear outrigger bar 29' to more securely hold the wheel of the cycle. Alternatively, the bend area 21 of the rear chock may be raised so that the rear outrigger bar 29' may be in the same plane as the front outrigger bar 28' (not shown).

One of the advantages with this embodiment is the ease in which the front and rear chocks may be manufactured. That is, the rear chock may be formed from a single tubular section and bent 180° along the mid point to form the rear chock 20' as shown in FIG. 15. Also, the front chock 19' may be manufactured by simply welding the cylinders 106 to the free ends of the arcuate member, thus saving time, money and, at the same time, reducing the weight of each piece.

With regard to a dolly 33', in this embodiment, arms 34' are preferably formed of a tubular member also. Alternatively, other cross-sectional members are within the scope of the present invention, such as square and oval cross-sectional members. The outer end of the arms 34' each has a caster wheel assembly 36' to facilitate movement of the cycle. Also, as in the previous embodiment, the pivotal ends of arms 34' are rotatably coupled to the trunnions (not shown) that extends through lengths 38' (front and back) which connect the pivotal ends of the arms. The manner in which the protruding trunnions associate with the holes on the free ends 39' and automatically lock into position as the arm rotate are substantially similar to the previous embodiment shown in FIGS. 1–11.

Figure 13:
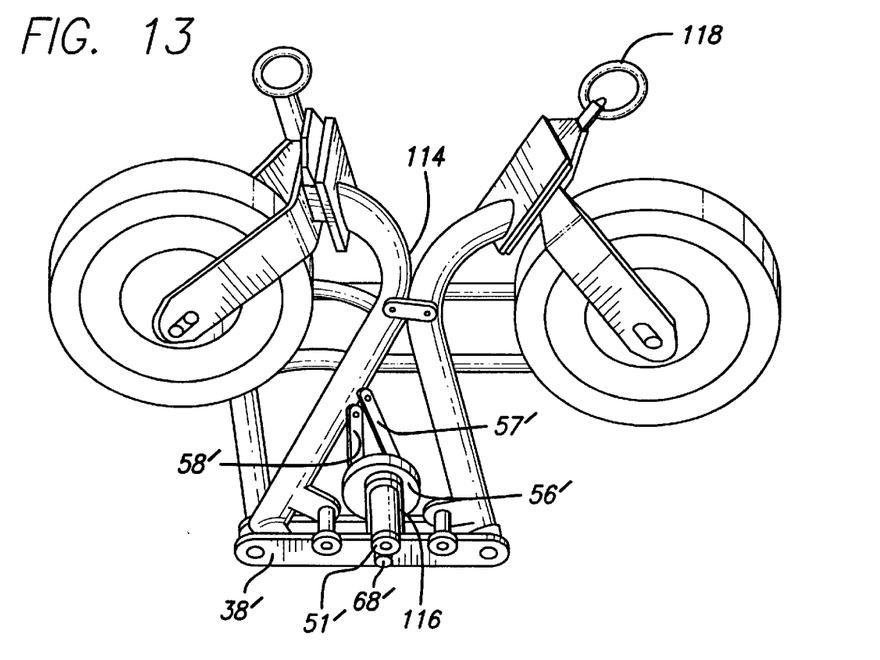
FIG. 13 is another perspective view corresponding to FIG. 12 with the dolly in a collapsed condition ready for carrying by the operator.

In FIG. 13, the dolly is shown in a retracted position where a latch 114 is used to hold the arms together. Again, use of tubular members reduces the overall weight of the dolly, and minimize the sharp edges so that there is less likely chance of cutting a user accidentally. As such, the smoothness of the tubular members and lighter weight make the handle 33a as shown in the previous embodiment unnecessary. Instead, the dolly may be carried by grasping around the latch area. Furthermore, with regard to a horizontal actuating shaft 51', it has an opening 116 to receive the lower end of an actuator handle 54' to actuate the shaft 51'. The actuator handle may also be used to tow the transporting apparatus 100 around. Incidentally, when the arms are in the retracted position, the links 57', 58' are disconnected. Additionally, the free ends of the arms 34' each have an eye-bolt 118 which may be hooked up to a winch so that if a bike is located in an area where it is difficult to handle, a winch may be coupled to the eye-bolt and pulled.

Figures 17, 18, 19, 20:
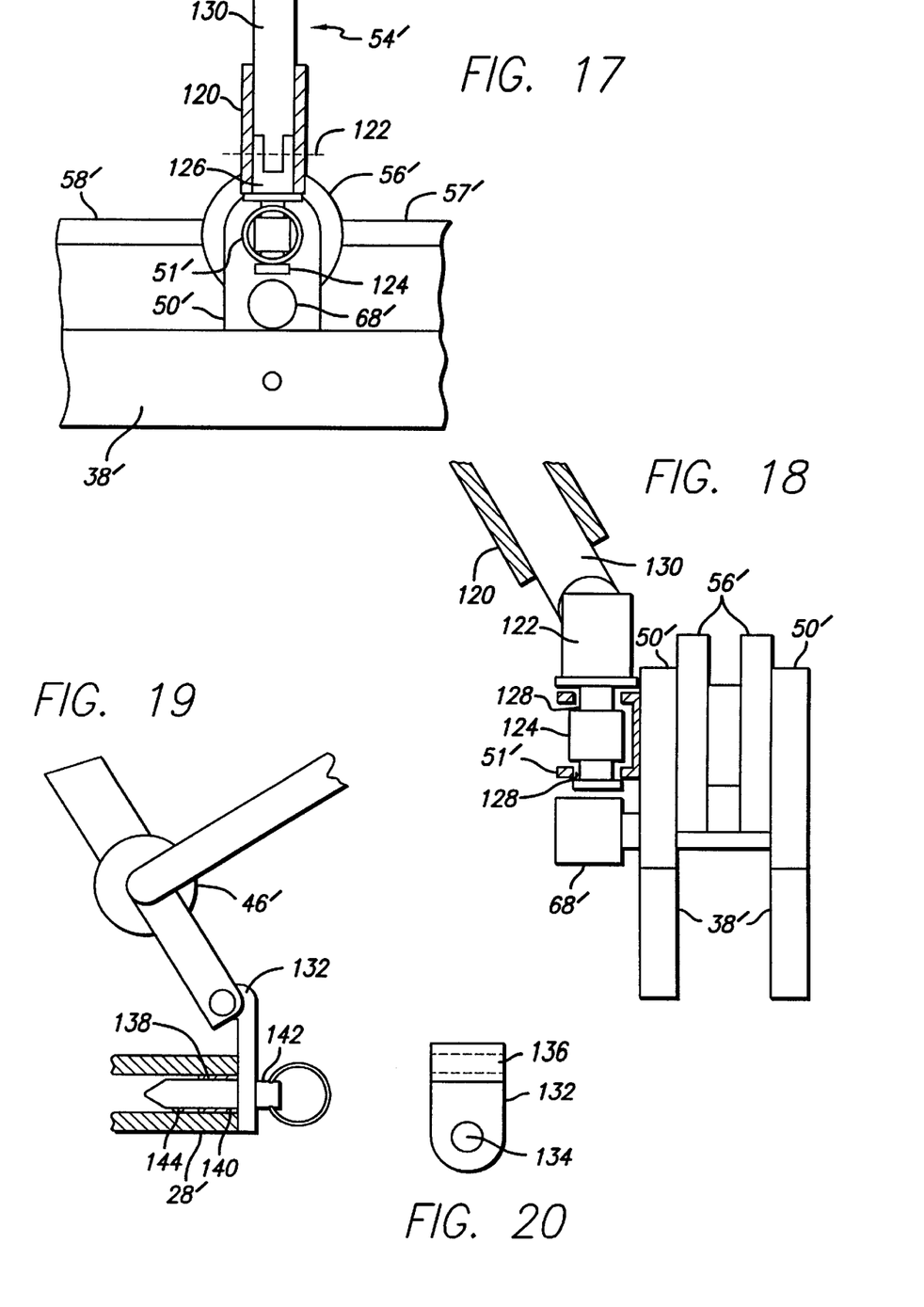
FIG. 17 is a close up view of the dolly around the shaft area corresponding to FIG. 13.
FIG. 18 is a side view of the dolly around the shaft area corresponding to FIG. 13.
FIG. 19 is a cross-sectional view of an outrigger bar along the line 19—19 in FIG. 15, along with a clip to facilitate attaching a ratcheting strap to the end of the outrigger bar.
FIG. 20 is a side view of an exemplary clip.

As shown by way of example in FIGS. 17 and 18, the actuator handle may be used for both towing and rotating the shaft. FIG. 17 illustrates a condition where the actuator handle is used to rotate the shaft. Here, the actuator handle includes an arm 130, which is pivotally coupled to a hinge 126 about the rotating axis 122. Enclosing the arm and the hinge is a collar 120 which may slide up and down relative to the arm 130. When the collar is in a down position as shown in FIG. 17, the arm and the hinge are locked in position such that the arm cannot pivot about the rotating axis 122. To engage the actuator handle to the horizontal actuating shaft, the actuator handle also includes a notched pin 124. The notches in the pin 124 allow it to cock catch the bottom of the cross drilled holes 128 (see FIG. 18) in the actuating shaft 51'. Accordingly, to rotate the shaft, the collar is placed in the down position and the pin 124 is inserted into the holes 128, thereafter, the handle is ready to be rotated.

FIG. 18 illustrates a condition where the actuator handle is used to tow the transporting apparatus. Here, the collar 120 is pulled up, which allows the arm 130 to pivot about the rotating axis 122, so that when the pin 124 is engaged with the holes 128, the force applied to the actuator handle is transferred to the shaft to move the transporting apparatus.

Figure 14:
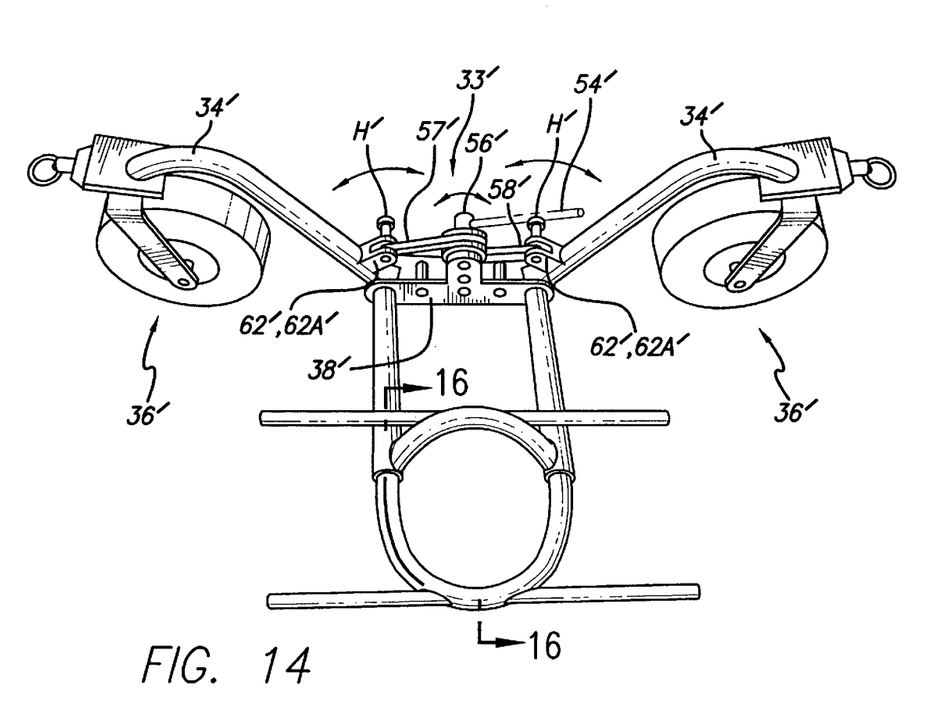
FIG. 14 is yet another perspective view corresponding to FIG. 12, with the arms of the dolly in the extended position.

As shown in FIG. 14, the dolly 33' operates in a substantially similar manner as the previous embodiment. That is, once the links 57', 58' are in the operating condition as shown in FIG. 14, the operator employs the actuator handle 54' by rotating it approximately 90° counterclockwise from the FIG. 14, thereby activating the outer ends of the arms 34' apart and elevating the central region of the dolly 33'. The degree of rotation of the actuator handle 54' and thus actuating shaft 51' and the two spaced apart wheels 56' is controlled by a limit or stock element consisting of a pin 68' that passes fixedly through the forward bearing plate and into an actuating groove in the forward wheel.

FIG. 14 also shows the links 57', 58' associated with its respective arm end portions. As in the previous embodiment, the operator pulls the handle H' to permit the respective links 57', 58' to sockets 62', 62a' associated with each of the arms. Accordingly, links 57', 58' are pivotally coupled to its respective sockets so that when the actuator handle 54' is rotated approximately 90° counterclockwise from the FIG. 14 position, the arms 34' extend and elevates the dolly off of the ground. Furthermore, as illustrated in FIG. 12, when the front wheel 13' has been nested closely between the front and rear chocks and the cycle 10' is strapped tightly in the vertical position to the front and rear outrigger bars, for example, as the actuator handle 54' is rotated, a powerful lever action is created to lift the wheel 13' and thus the foreportion of the cycle 10' off of the floor.

Figure 12:
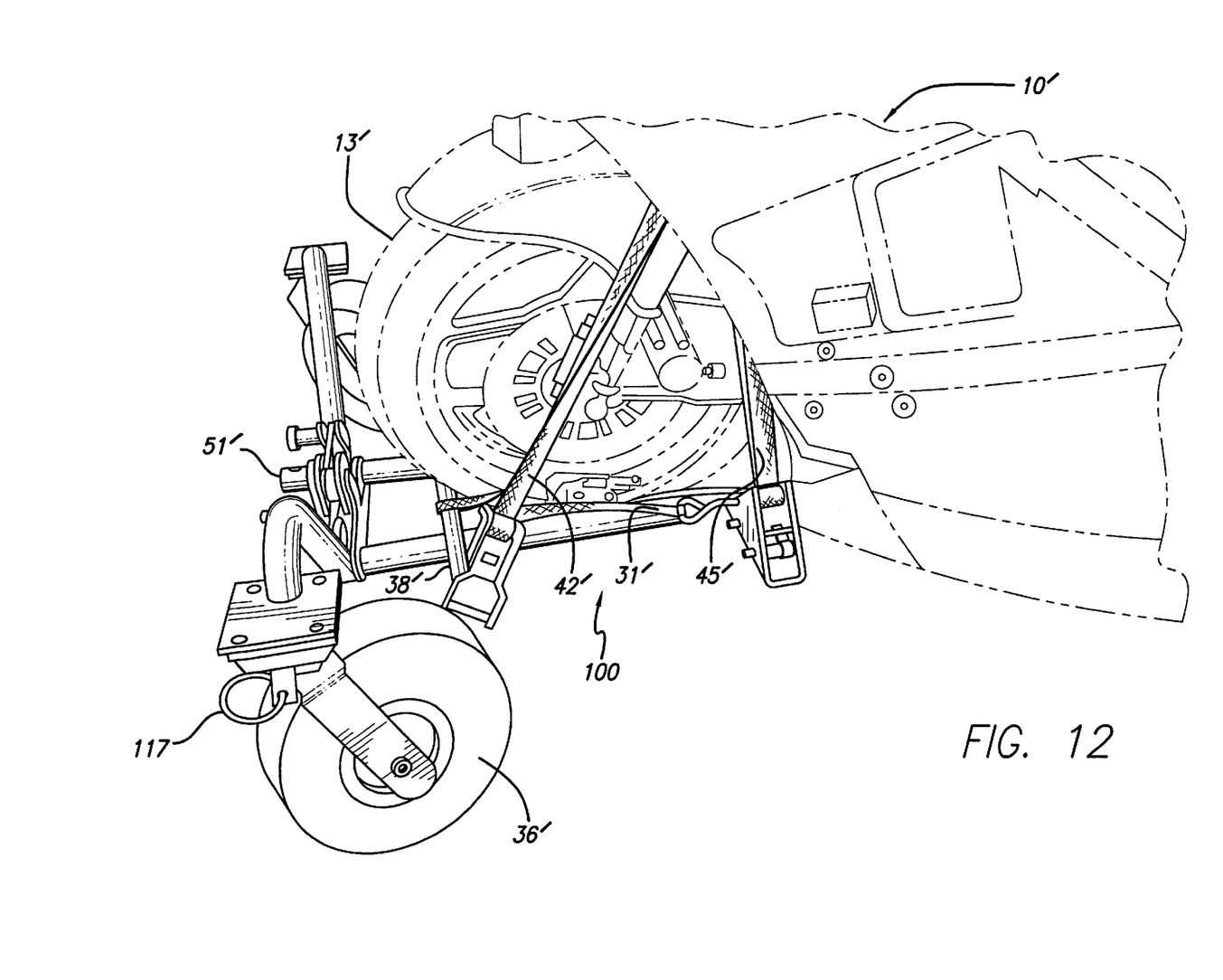
FIG. 12 is a perspective view of another embodiment of the present invention showing the front wheel of a cycle secured to another chock/cradle embodiment apparatus raised off of the floor.

With regard to the method of installing the transporting apparatus to the front wheel of the cycle, the U-shaped rear chock 20' is preferably first placed behind the front wheel of the cycle, as shown in FIG. 12. Next, the front chock 19' is installed to slide along the parallel members 108 of the rear chock 20' until the bend area of the front chock associates with the front side of the wheel. Then, the dolly is coupled to the rear chock via trunnions of the dolly inserted into the respective holes of free ends 39' of the rear chock.

In FIG. 12, as described above in the previous embodiment, various straps are used to securely hold the cycle onto the transporting apparatus assembly 100. For example, straps 42 (note that a corresponding strap 42 is on the other side of the front wheel) extend between the outer ends of the front outrigger bar 28' and suitable support position on the upper portion of the cycle 10'. To tighten the straps, a ratcheting mechanism may be utilized for a desired tightness. Furthermore, strap 31' is used to couple the front and rear chocks together to prevent the chocks from spreading apart due to the force applied by the front wheel. Additionally, straps 45' may also be used to extend between the outer ends of the rear outrigger bar 29' and a suitable connection position at the upper region of the cycle 10'. Note that the straps 45' provide the combination of wheel holding and bootstrap elements.

FIGS. 19 and 20 illustrate by way of example, a clip 132 that is releasably coupled to the end of the outrigger bar 28' to further facilitate attaching one end of the ratcheting mechanism 46' to the end of the outrigger bar. In this regard, the clip has a hole 134 and a tunnel 136 to pivotally couple to the ratcheting mechanism. Furthermore, each end of the outrigger bars are pressed fitted with a bushing 138 to create a lip 140 within the interior walls of the outrigger bars. To releasably couple the clip to the outrigger bar is a retaining pin 142 with a pressure sensitive ball 144. Once the retaining pin is inserted into the hole and the bushing, the pressure sensitive ball keeps the retaining pin within the outrigger bar. This arrangement allows for a very close coupling of the ratcheting strap to the outrigger bar. Additionally, the ratcheting mechanism may pivot about the clip via the tunnel 136, and also rotate about the hole 134. To remove the pin, the ring on the pin is pulled straight back.

As shown in FIG. 12, once the front wheel of the cycle is securely held within the transporting assembly 100, actuating the handle 54' lifts the transporting assembly along with the wheel 13' so that the front wheel of the cycle 10' is off of the floor. With the front wheel off of the floor, the cycle may be easily moved because the wheels 36' are now engaged with the floor rather than the front wheel of the cycle. Note that the transporting assembly may be moved in a variety of ways. For example, a crank handle may be inserted into actuating shaft 51' to pull or push the transporting assembly or a winch may be coupled to the eye-bolts 118 to pull the transporting assembly if the floor is inclined or has a ramp.

Figure 21:
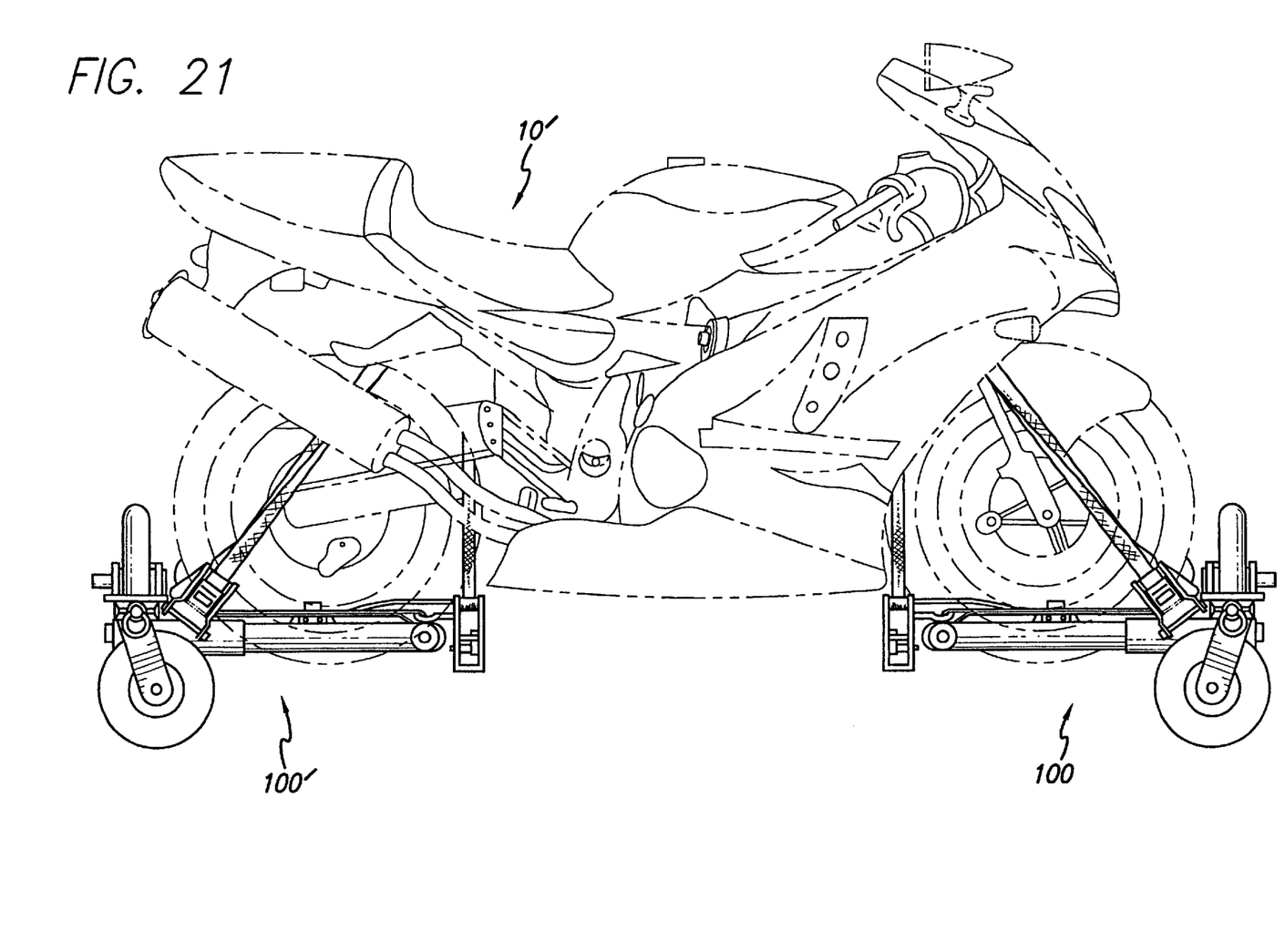
FIG. 21 is a side view showing the front and back wheels of a cycle secured to a pair chock/cradle apparatuses, respectively, to raise the front and back wheels off of the floor.

Although the above embodiment describes a transporting assembly on the front wheel of a cycle, it is also within the scope of the present invention to have a second transporting assembly 100' to raise the back wheel of the cycle. In other words, cycle 10' would be raised off of the floor via a transporting assembly on both front and rear wheels. Accordingly, the cycle 10' may be easily handled around a garage, shop, or maneuvered into the back bed of a tow truck. For example, a tow truck with a hydraulic back bed that can incline with a motorized winch can be used to hook up to the eye bolts on the dolly to pull the cycle on the transporting assembly onto the back bed. In this way, a single operator can easily maneuver the cycle onto the back bed and tow the cycle to any destination. This is especially helpful when the cycle is immobile for any reason or for impounding the cycle. Additionally, the transporting assembly may be used to maneuver three-wheel vehicles. That is, transporting assembly may be strapped to any one of the three wheels or all three wheels to transport the cycle. With regard to material, the transporting assembly may be made of a variety of materials known to one of ordinary skill in the art, such as stainless steel, aluminum, and/or plastics. Furthermore, the arms of the dolly, front and rear chocks may be formed from a variety of cross-sectional members, such as oval, square, rectangular, and channel members.

The foregoing detailed description is to be clearly understood as given by way of illustration and example only, the spirit and scope of this invention being limited solely by the appended claims. With respect to the claims, it is applicant's intention that the claims not be interpreted in accordance with the sixth paragraph of 35 U.S.C.§ 112 unless the term "means" is used followed by a functional statement.

What is claimed is:

1. An apparatus assembly for transporting a cycle, comprising:
   a rear chock adapted to associate with the back side of a first wheel of the cycle;
   a front chock adapted to associate with the front side of the first wheel of the cycle;
   a pair of side bars releasably coupled to the front and rear chocks;
   a dolly adapted to couple to the front side of the first wheel, the dolly coupled to the pair of side bars extending from the front chock side of the pair of side bars; and
   said dolly having an actuator and a pair of arms, wherein each of said arms have a pivotal end and a free end, said pivotal end of each of said arms pivotally coupled to the actuator, wherein rotation of said actuator causes said pair of arms to extend from a first position to a second position, and counter rotation of said actuator causes said pair of arms to retract from said second position to said first position, wherein said first position is in a retracted position and said second position is in an extended position;
   a wheel coupled to each of said free end of said arms; and
   wherein said pair of arms in said second position raises the apparatus assembly along with the first wheel of the cycle, secured to said apparatus assembly.

2. An apparatus assembly according to claim 1, including a back outrigger bar protruding from each side of the pair of side bars near the rear chock and a front outrigger bar protruding from each side of the pair of side bars near the front chock.

3. An apparatus assembly according to claim 2, wherein the first wheel of the cycle is secured to the apparatus assembly by a plurality of straps.

4. An apparatus assembly according to claim 1, including a handle to tow the apparatus assembly.

5. An apparatus assembly according to claim 1, including a second apparatus assembly associated with a second wheel of the cycle to lift the entire cycle off of the floor.

6. An apparatus assembly according to claim 5, wherein the two apparatus assemblies are used to raise the first and second wheels of the motorcycle to roll the motorcycle on to a bed of a tow truck.

7. A transporting assembly for maneuvering a cycle, comprising:
   a rear chock adapted to associate with the back side of a first wheel of the cycle;
   a front chock adapted to associate with the front side of the first wheel of the cycle, said front chock releasably coupled to said rear chock;
   a dolly releasably coupled to the front side of the first wheel, the dolly coupled to at least one of said front and rear chocks, said dolly having a rotatable actuator and a pair of arms each having a pivotal end and a free end, each of said arms adapted to link to said actuator; and
   a wheel coupled to each free end of said arms;
   wherein when said actuator is linked to said pair of arms and said actuator is activated, said pair of arms extend to cause the wheel of each said arms to come in contact with the floor, thereby raising the transporting assembly along with the first wheel of the cycle which is secured to the transporting assembly, whereby said cycle secured to said transporting assembly may be maneuvered.

8. A transporting assembly according to claim 7, wherein said rear chock is formed from a tubular member.

9. A transporting assembly according to claim 7, wherein said rear chock has an approximately 180° bend near the area that associates with the back side of the first wheel of the cycle and two free ends.

10. A transporting assembly according to claim 8, wherein the front chock has an arcuate bend with two free ends, wherein each of said two free ends being a cylinder, said cylinder having an inner diameter slightly greater than the outer diameter of said tubular member of the rear chock.

11. A transporting assembly according to claim 9, wherein said dolly has a pair of trunnions to associate with an opening at each of the two free ends of the front chock, wherein said pair of trunnions are coupled to the pair of arms respectively and rotate as said arms rotate, each of said trunnions having an annular groove, each of said opening at two free ends having a pin, wherein said pin of each opening engages with respective annular groove as said arms rotate.

12. A transporting assembly according to claim 7, wherein said actuator is activated by rotating the actuator.

13. A transporting assembly according to claim 7, including a latch pivotally coupled to one of said arms, wherein deactivation of said actuator releases the arms from extending, thereby allowing said arms to be in a retracted position, wherein said arms are held in the retracted position by said latch coupling to the other arm.

14. A transporting assembly according to claim 7, including an eye bolt coupled to the dolly.

15. A transporting assembly according to claim 7, including a front outrigger bar protruding from the front chock, and a rear outrigger bar protruding from the rear chock.

16. A transporting assembly according to claim 7, including a pair of side bars to couple the front and rear chocks.

17. A transporting assembly according to claim 7, including a handle releasably coupled to said rotatable actuator of said dolly, wherein said handle has an arm pivotally coupled to a hinge enclosed by a collar movable between first and second positions, wherein in said first position said collar locks said arm and said hinge from pivoting to actuate said rotatable actuator, wherein in said second position said arm is free to pivot about said hinge to tow said transporting assembly.

18. A transporting assembly according to claim 7, including outrigger bars and a clip releasably coupled to each end of said outrigger bars to facilitate securing the first wheel of the cycle to the transporting assembly.

19. A method of transporting a cycle, comprising the steps of:

providing a transporting assembly including a rear chock, front chock and a dolly, wherein the dolly has an actuator and a pair of arms, wherein each of said arms have a pivotal end and a free end, said pivotal end of each of said arms pivotally coupled to the actuator and the free ends having a wheel, wherein rotation of said actuator causes said pair of arms to extend to raise the transporting assembly;

placing the rear chock behind a first wheel of a cycle;

placing the front chock on the front side of the first wheel of the cycle;

coupling the front and rear chocks together;

coupling the dolly to the front side of the first wheel, the dolly coupled to the front and rear chocks;

securing the first wheel of the cycle to the front and rear chocks; and rotating the actuator to raise the transporting assembly along with the first wheel of the cycle, whereby the transporting assembly and the cycle may be moved by applying force to the transporting assembly.

20. A method according to claim 19, further including the step of:

coupling a handle to the transporting assembly to tow around the transporting assembly.

21. A method according to claim 19, further including the step of:

assembling a second transporting assembly on a second wheel of the cycle.

22. A method according to claim 21, further including the step of:

rotating the actuator of the second transporting assembly to raise the second wheel of the motorcycle; and moving the motorcycle raised on first and second wheels to a back bed of a tow truck.

* * * * *